(12) United States Patent
Galstian et al.

(10) Patent No.: US 6,398,981 B1
(45) Date of Patent: Jun. 4, 2002

(54) PHOTOPOLYMERIZABLE COMPOSITION SENSITIVE TO LIGHT IN A GREEN TO INFRARED REGION OF THE OPTICAL SPECTRUM

(75) Inventors: Tigran Galstian, Ste-Foy; Amir Tork, Cap-Rouge, both of (CA)

(73) Assignee: Universite Laval, Ste-Foy (CA)

( * ) Notice: Subject to any disclaimer, the term of this patent is extended or adjusted under 35 U.S.C. 154(b) by 0 days.

(21) Appl. No.: 09/503,208

(22) Filed: Feb. 14, 2000

Related U.S. Application Data (63) Continuation-in-part of application No. 09/398,091, filed on Sep. 17, 1999, now abandoned.
(60) Provisional application No. 60/101,087, filed on Sep. 18, 1998.

(51) Int. Cl.[7] .................. C09K 19/52; G02B 6/255; C08F 2/46; C08J 3/28
(52) U.S. Cl. .................. 252/299.01; 252/299.66; 252/299.67; 428/1.31; 385/95; 522/2; 522/26; 522/28; 522/63; 522/65; 430/321; 430/332; 430/333; 430/334; 430/338; 430/340; 430/343; 430/345; 430/270.1; 430/270.2; 430/270.21
(58) Field of Search .................. 252/299.01, 299.66, 252/299.67; 430/2, 20, 321, 311, 332–334, 338, 340, 345, 343, 269, 270.1, 270.15, 270.17, 270.2, 270.21; 428/1.31; 522/2, 26, 28, 63, 65

(56) References Cited

U.S. PATENT DOCUMENTS

| | | | |
|---|---|---|---|
| 4,343,891 A | | 8/1982 | Aasen et al. |
| 5,472,759 A | * | 12/1995 | Chen et al. |
| 5,541,039 A | * | 7/1996 | McFarland et al. |
| 5,698,343 A | * | 12/1997 | Sutherland et al. |
| 5,815,484 A | * | 9/1998 | Smith et al. |
| 5,849,270 A | | 12/1998 | Podszum et al. ............. 424/55 |
| 5,942,157 A | * | 8/1999 | Sutherland et al. |
| 6,091,879 A | * | 7/2000 | Chan et al. |
| 6,155,152 A | * | 9/2000 | Popovich et al. |

FOREIGN PATENT DOCUMENTS

| | | |
|---|---|---|
| EP | 0 269 397 | 6/1988 |
| EP | 0 323 563 | 7/1989 |
| EP | 0389067 A2 * | 9/1990 |
| EP | 223587 | 2/1991 |
| EP | 0 424 866 | 5/1991 |
| EP | 389067 | 10/1994 |
| EP | 387087 | 10/1997 |
| WO | WO 98/46196 | 10/1998 |

OTHER PUBLICATIONS

Pilot et al., Proceedings of the SPIE, vol. 3635, 1999, pp. 143–150.
Pilot et al., Proceedings of the SPIE, vol. 3638, Jan. 26, 1999, pp. 26–34.
Crawford et al., J. Soc. Information Display, vol. 5, No. 1, pp. 45–48, 1997.
Domash et al., 1997 Digest of the IEEE/LEOS Summer Topical Meetings, SPIE, vol. 3010, pp. 214–228, 1997.
Domash et al., SPIE–Int. Soc. Opt. Eng, vol. 2689, pp. 188–194, 1996.
Chatterjee et al., J. Am. Chem. Soc., vol. 112, pp. 6329–6338, 1990.
Schuster et al., J. Photochem. Photobiol. A: Chem., vol. 65, pp. 191–196, 1992.
Chatterjee et al., J. Am. Chem. Soc., vol. 110, No. 7, pp. 2326–2329, 1988.
Cooper et al., J. Am. Chem Soc., vol. 85, pp. 1590–1592, 1963.
Noriet et al., Pure and Applied Optics, vol. 3, No. 1, pp. 55–71, 1994.

* cited by examiner

Primary Examiner—Susan W. Berman
(74) Attorney, Agent, or Firm—Ogilvy Renault (57) ABSTRACT

The present invention is concerned with photopolymer materials sensitive to infrared, near infrared, red and green light radiation for initiating polymerization and to applications of such photopolymer, like holographic polymer dispersed liquid crystal (H-PDLC) or reversible dye doped photopolymer (RDDP) materials, for making optical devices. The invention relates to holographic polymer dispersed liquid crystal and reversible dye materials having improved electrical and optical switching properties.

26 Claims, 3 Drawing Sheets

Figure 1a: Microscopic texture observed in hologram exposed area.

Figure 1b: Microscopic texture observed in unexposed areas (after uniform exposition).

Figure 2: Diffraction efficiency as a function of exposure time for H-PDLC materials recorded by diode laser at 850 nm (exposure at 6.8 mw/cm$^2$)

Figure 3. Diffraction efficiency as a function of exposure time for H-PDLC materials recorded by diode laser at 514.5 nm (exposure at 38 mw/cm$^2$)

Figure 4. Exposure set up for in-situ recording and monitoring of the diffractive optical elements on H-PDLC material

PHOTOPOLYMERIZABLE COMPOSITION SENSITIVE TO LIGHT IN A GREEN TO INFRARED REGION OF THE OPTICAL SPECTRUM

CROSS-REFERENCE

The present application is a continuation-in-part of U.S. patent Appln. Ser. No. 09/398,091 filed Sep. 17, 1999, now abandoned, and claims priority under 35 USC § 119(e) of U.S. provisional patent application serial number 60/101,087 filed Sep. 18, 1998.

FIELD OF THE INVENTION

The present invention relates to photopolymer materials sensitive to infrared, near infrared, red and green light radiation for initiating polymerization and to applications of such photopolymer, like holographic polymer dispersed liquid crystal (H-PDLC) or reversible dye doped photopolymer (RDDP) materials, for making optical devices. The invention relates to holographic polymer dispersed liquid crystal and reversible dye materials having improved electrical and optical switching properties.

BACKGROUND OF THE INVENTION

Infrared (IR) diode sources are largely used in integrated photonic circuits and the list of their applications grows very rapidly. The management of the radiation of these sources requires the fabrication of optical elements such as lenses, interconnects, modulators, etc. Holographic diffractive elements are emerging as very promising for these applications. These include wavelength selective holographic interconnects (1 to N, or M to N), couplers, lenses, mirrors. Today, a new class of Holographic Photopolymer Dispersed Liquid Crystal Materials (H-PDLCs) is considered to be one of the most viable technologies for the development of reflective color displays, switchable holographic optical elements (such as Bragg gratings for Wavelength Division Multiplexing (WDM) devices), switchable-focus lenses, etc. See for example Crawford et al., "Reflective color LCDs based on H-PDLC and PSCT technologies", *J Soc. Information Display*, 1996, 5(1); Domash et al., "Electronically switchable waveguide Bragg gratings for WDM routing", 1997 Digest of the IEEE. /LEOS Summer Topical Meetings: Vertical-Cavity Lasers/Technologies for a Global Information Infrastructure/WDM Components Technology; and Domash et al., "Switchable-focus lenses in holographic polymer dispersed liquid crystal", Proceedings of the SPIE—The International Society for Optical Engineering, vol. 2689, (Diffractive and Holographic Optics Technology III, San Jose, Calif., USA, 1–2 Feb. 1996.) SPIE-Int. Soc. Opt. Eng, 1996. p. 188–94.

Commercially available holographic materials are generally sensitive in the UV/visible part of the spectrum only. Thus, the actual fabrication of above-mentioned elements requires an initial recording step, where a UV-Visible laser source is used, and then, a further adaptation or adjustment of the obtained element for utilization with near IR wavelengths (e.g. 800–850 nm or 1300–1500 nm), which are used in local or long distance communication systems. Due to strong astigmatism and divergence of the used diode lasers, this work is difficult and has poor efficiency. It would therefore be highly desirable to provide in situ recording of holographic diffractive elements with lasers, which are already integrated in the given photonic circuit, thus providing self-alignment of the photonic circuits. Thus, there is a need to extend the sensitivity of these materials up to communication wavelengths. Namely, for in situ holographic recording of optical components with diode lasers operating in the 800–855 nm, among which there are Vertical Cavity Surface Emitting Lasers (VCSEL), it is important to have H-PDLC material with suitable holographic characteristics, which include high sensitivity and diffraction efficiency of the recording, low scattering and noise level, and low switching voltage.

Up to now, the sensitivity of the existing H-PDLC materials has been extended up to 790 nm (Natarajan et al., Report on Photonics West 98, San Jose, January 1998). Photopolymerizable materials have been recently proposed with sensitivity in the 800–850 nm area, for example in co-pending application Ser. No. 09/503,207, filed on Feb. 14, 2000. See also EP 0 223 587; EP 0 387 087; EP 0 389 067; U.S. Pat. No. 4,343,891; Chatterjee et al., J. Am. Chem. Soc., 1990, 112, 6329; Schuster et l, Photochem. Photobiol. A: Chem., 1992, 65, 191; Chatterjee et al., J. Am. Chem. Soc., 1988, 110, 2326; Cooper et al., J. Am. Chem. Soc., 1963, 85, 1590; and Noiret et al., Pure and Applied Optics, 1994, 3(1), 55–71. Imaging applications with low resolution (such as printing plates) were also successfully explored. Some of the materials were the subject of the study for holographic gratings recording and only very low level of performance was achieved (7% of diffraction efficiency at sensitivity of about 300–500 mJ/cm2), as reported in the mentioned Noiret et al. article supra. This low level of performance makes such polymers impractical for commercial application. All the above materials still suffer from limitations such as spatial resolution, diffraction efficiency etc.

SUMMARY OF THE INVENTION

In accordance with the present invention, there is now provided a photopolymerizable formulation sensitive to light in a green to infrared region of the optical spectrum comprising:
 a) a photopolymerizable monomer, oligomer or mixtures thereof;
 b) a photoinitiator sensitive to light in the green to infrared region;
 c) an additive for increasing the refractive index and decreasing the viscosity of the formulation; and
 d) an optional filler having optical properties selected to contrast with optical properties of a polymer resulting from photopolymerization of the monomer, oligomer or mixtures thereof.

Preferably, the formulation comprises filler, which is a liquid crystal or a reversible dye, or combinations thereof, or any other filler materials such as mesogens having polar or functional groups. The liquid crystal preferably has a polar group attached to ends of the molecule chain elements, whereby droplets of LC matter are more efficiently formed in the polymer dispersed in the liquid crystal material. Larger droplets allow for more efficient optical state switching.

In a second aspect of the invention, there is provided a process for making an optical device comprising the steps of:
 preparing a photopolymerizable formulation sensitive to light from green to infrared region of the optical spectrum, the formulation comprising
  a) a photopolymerizable monomer, oligomer or mixtures thereof;
  b) a photoinitiator sensitive to light in the region
  c) an additive for increasing the refractive index and decreasing the viscosity of the formulation; and d) an optional filler having optical properties selected to contrast with optical properties of a polymer resulting from photopolymerization of the monomer, oligomer or mixtures thereof;

applying a layer of the formulation on an optical element;

first exposing the optical element comprising the formulation to a light source emitting light in the region, to polymerize the formulation and produce a recording pattern on the optical element; and optionally second exposing the optical element to the light to polymerize any remaining portion of the formulation not polymerized during first exposing, thereby producing said optical device.

Finally, in a third aspect of the present invention, there is provided a process of making an optical connection between at least two waveguides or light guides of an optical element by photopolymerization, the process comprising the steps of:

preparing a photopolymerizable formulation sensitive to light from green to infrared region of the optical spectrum, the formulation comprising:
 a) a photopolymerizable monomer, oligomer or mixtures thereof;
 b) a photoinitiator sensitive to light in the green to infrared region;
 c) an additive to increase the refractive index and decrease the viscosity of the formulation; and
 d) an optional filler;

applying a sufficient amount of the formulation between the waveguides or light guides of the optical element to be connected; and exposing the optical element to a light source emitting light in the region to polymerize the formulation, thereby making an optical connection between the at least two waveguides or light guides.

Preferably, the light is transmitted during the exposing through at least one of the at least two waveguides or light guides. While a filler is also optional in the case of optically coupling waveguides or light guides, a filler having the desired optical properties is preferred to reduce the amount of polymer used and to impart desirable physical properties to the formulation.

DETAILED DESCRIPTION OF THE INVENTION

The present invention is concerned with a photopolymerizable formulation comprising an organic additive that extends the sensitivity of the resulting polymerized materials up to communication wavelengths, and makes such materials very practical for commercial applications. The resulting polymerized materials also show very good optical characteristics. The formulation may also advantageously comprise a conventional filler, generally a liquid crystal or a reversible dye, to enhance the beneficial effect. The present invention further provides a novel filler that provides even better results when used in combination with the organic additive. The details thereof are found below.

The invention further relates to a process for making electrical and optical switching materials, by using as a filler a photochromic reversible dye to provide the latter functionality.

The photopolymerizable formulation of the present invention possesses a sensitivity extending up to communication wavelengths, thus making the formulation practical for commercial applications. Some of the advantageous characteristics of the present formulation include:

sensitivity to the illumination from visible (e.g. about 500 nm) up to 1000 nm;

suitable holographic characteristics such as:
 a) high diffraction efficiency (e.g. 98% between 514 and 850 nm);
 b) high sensitivity, preferably greater than 100 mJ/cm$^2$;
 c) low scattering and noise level; and
 d) low switching voltage, preferably lower than 100 V;

optical switching properties in the presence of a photochromic reversible dye; and a simple manufacturing process.

The optical properties mentioned above were obtained as a result of the addition of an additive, preferably organic, combined with a liquid crystal or a reversible dye as the filler. Consequently, the fabrication of the photopolymerizable film is unexpectedly simple, deprived of any filtration step, and the film thus obtained has excellent uniformity and optical quality.

The invention also provides a process of making an optical switching system, in which a photochromic reversible dye material, such as Fulgide or Spiropyran, is used. As it will be seen below, hologram recording experiments show high diffraction efficiency and optical switching properties. The presence of an organic additive compound into the photopolymer system allows a simple manufacturing process for the optical device, with a good uniformity resulting from the capillary effect.

The present formulation can also be applied to prototyping and non-optical applications, and allows to implement optical coupling of light guides, as well as the manufacture of optical devices, in particular diffractive and holographic optical devices. Advantageously, such devices can be recorded or made using light from green to infrared region coming from a light source used in the optical device, such as commonly used communication light sources.

The optical device obtained with the present process comprises a recording pattern provided on the optical element, wherein the layer of the formulation is polymerized in accordance with the pattern and forms a low density of filler droplet in exposed areas and a high density of filler droplet. In unexposed areas, the layer has different optical properties suitable for forming the optical device by the areas of high density and the areas of low density of filler droplet.

In a preferred embodiment, the photoinitiator comprises a dye sensitizer, an initiator and a co-initiator, wherein the dye sensitizer is efficiently excited by the light to produce an excited dye sensitizer, and the initiator and the co-initiator are excited by the excited sensitizer thereby initiating radical polymerization.

Preferably, the step of polymerization comprises second exposing at least unexposed portions of the optical device to ensure complete photopolymerization of the formulation applied on the optical element. The recording pattern may represent a diffraction pattern or a diffractive lens.

The novel liquid crystal (LC) filler according to the present invention has a polar group, such as a cyano group, whereby droplet of LC matter is more efficiently formed in the polymer dispersed liquid crystal. Larger droplets allow for more efficient optical state switching. Alternatively, the latter may be substituted with other possible modifications of LC such as ferroelectric LCs, cholesteric LCs, fluorinated LCs and the like, which are well known to those skilled in the art.

The dye sensitizer is a dye absorbing from green to infrared light, preferably a cyano containing dye, such as cyanine. The initiator is preferably an electron donor comprising a heavy atom like bromine, iodine, boron, iron etc, such as $CBr_4$, $CHBr_3$, $CHI_3$ etc.

An optional co-initiator may also be added to the formulation. Such co-initiator would typically have the same role as that of the initiator. Such co-initiator is preferably a tertiary aromatic amine, for example ethyl dimethyl benzoate, 1-phenylpiperidine; butyl-4-(N-morpholino) benzoate; 4-nitro-N,N-dimethylaniline; 4-(dimethylamino) benzonitrile and the like.

An organic additive is added to the formulation to lower the viscosity thereof and increase the refractive index. A low viscosity permits the use of the capillary effect during the manufacture of the film, while an increase in the refractive index allows an increase in the refractive index modulation contrast. Both of these parameters are therefore important. The additive must be compatible and miscible with all the components of the formulation without creating any interference during the polymerization process or altering the efficicency of the resulting optical device. 2,5-dibromothiophen and amyl acetate have been found particularly suitable for this purpose. The additive allows the preparation of excellent homogenate photopolymerizable films by capillary effect.

The photochromic reversible dye makes the optical device switchable between two optical states when placed in a controllable electric and optical field.

According to a preferred embodiment, a novel liquid crystalline filler having excellent optical properties has been synthesized. The filler has the general formula
ti $XC_nO_mNR_1R_2$ wherein $R_1$ and $R_2$ are the same or different, and are a straight or branched $C_{1-10}$ alkene straight or branched $C_{1-10}$ alkene or straight or branched $C_{1-10}$ alkyne;

X is linking group substituted by at least one polar group, preferably a cyano group.

$C_n$ is a straight or branched alkyl chain of from 5 to 14 carbon atoms, optionally containing one or more insaturations; and m is 0 or 1.

The role of the linking group X is mainly to act as a support for one or more polar group. Such linking group can be of any kind, as long as it bears at least one polar group and does not interfere with the manufacturing (polymerization) process or the properties of the optical element onto which the layer is applied.

The synthesis of a novel filler according to the invention can be achieved in 2 simple steps according to the following exemplified by the following scheme:

$$XOH + WC_nW \rightarrow XOC_nW$$

$$XOC_nW + R_1R_2NH \rightarrow XC_nONR_1R_2$$

wherein W is leaving group.

In a most preferred embodiment, X is a cyano-monosubsituted biphenyl, n is 7 or 9 and $C_n$ is a straight alkyl chain, W is a halogen, and $R_1$ and $R_2$ are ethyl. The compound of formula I thus obtained can be prepared according to the following reaction scheme.

I

The first step comprises dissolving purified 4-hydroxy-4'-cyanobiphenyl in ethanol (99.5%), to which a molar equivalent of $K_2CO_3$ (stoichiometry ratio) is added. The solution is heated to 75 C for 30 minutes, then an excess of a α,ω-dibromoalkane derivative is added and the solution is stirred and refluxed for 6 h. During refluxing, a dark-yellow precipitate is obtained. The precipitate is collected, washed twice with ethanol (99.5%), and recrystallized from ethanol, giving the product 4-cyano-4'-bromoalkoxy biphenyl.

In the second step, the bromoalkoxy derivative is dissolved in chloroform, and the solution is heated to 45 C, and then a tenfold excess of diethylamnine is added. This solution is stirred at 60 C for 12 h. The product is obtained by evaporating the chloroform and excess diethylamine. It is then redissolved in 25 ml of chloroform, washed 3 times with basic water (1M aq. NaOH), and then three times with distilled water. Recrystallizing once from ethanol/propanol (70/30 v/v) and the column chromatography using the mixed solvent, hexane/chloroform (70/30, v/v), purified the final product 4-cyano-4'-aminoalkoxy biphenyl. The purified product, a brown-yellow viscose liquid, is then dried in vacuum at 45 C for three days. The yields for the products are 65–75%. NMR $H^1$: δ 1.05 (t, $CH_3$ aliphatic), 1.25 (m, $CH_2$ aliphatic), 1.82 (m, $OCH_2CH_2$), 2.45 (t, $NCH_2CH_2$), 2.58 (q, $N(CH_2CH_3)_2$), 3.99 (t, $OCH_2CH_2$), 6.96 (d, aromatic), 7.52 (d, aromatic), 7.64 (m, aromatic).

The final products generally form transparent solutions in chloroform, ethanol, acetone and pyridine at ambient temperature as well as in hot ethanol. They are generally not soluble in hexane or benzene.

Differential scanning calorimetry (DSC) and polarizing optical microscopy (POM) analyses The apparatus used is a Perkin Elmer DSC-7 with heating and cooling scans of 5 C/min and a polarizing optical microscopy using a Zeiss Axioskop microscope equipped with a Leica objective (160/-, L25/0.22, UT40/0.34). Photographs were obtained using 100 and 400 ASP films with a 35-mm camera equipped with a 40-mm objective. Thermal studies were effected using a Mettler FP52 hotplate and a FP5 controller. The samples were put between two glass slides for these studies.

In DSC analysis, both heating and cooling scans are generally employed to determine the reversibility of the transition sequence as well as to observe the extent of supercooling of each transition. Two distinct transitions are observed for the compounds tested on both heating and cooling. The temperature of the lower temperature transition is well below ambient and the higher temperature is about 50 C.

The present invention offers a new technical solution needed to provide efficient in situ recording of highly efficient and switchable holographic optical elements in the green to infrared regions. The unexpected results obtained with the present invention are mainly due to the presence of 2 components in the formulation: the additive, preferably organic, and the filler, the former being provided to increase the refractive index and decrease the viscosity to levels sufficient to increase the refractive index modulation contrast and to allow a simple manufacturing process of the sample by capillary effect without the need for any filtration.

The recorded holograms according to the present invention have high diffraction efficiency and unexpected wavelength dependence, e.g. 98% at near infrared, 70% at red and 95% at green regions. Indeed, with a proper choice of the formulation, the dispersion of the diffraction efficiency can be managed, that is, making this dependence to be growing or decreasing with the wavelength. In addition, the particular composition of the formulation allows the DC field and optical control of the diffraction efficiency, which provides, for example, switchable wavelength divisional multiplexing (WDM) elements. The present material shows monotonous recording kinetics and very high temporal and readout stability (after fixing). The fixing is performed by uniform light illumination and no curing is required, thus increases the capacity of the in situ fabrication of various integrated optical circuits.

Examples of suitable formulations in accordance with the present invention include the following:

| | |
|---|---|
| photopolymerizable monomers/oligomer | 40–80 weight % |
| dye sensitizer | 0.02–1.0 weight % |
| initiator | 1–15 weight % |
| co-initiator | 0–10 weight % |
| filler (liquid crystal or reversible dye) | 0–50 weight % |
| organic additive | 10–40 weight % |

For the purposes of the present invention, various other compounds can be considered as components for the various formulations. Examples include:
 as an acrylate monomers/oligomers: DPEPA, 2-ethoxy-ethoxy-ethyl acrylate ester, urethane acrylate CN975™ and the like;
 as a cyanine dye having a perchlorate anion: IR-140™, IR-132™, IR-143™, IR-786™ and the like (Aldrich);
 as an electron donor, i.e. heavy atom (preferably Br—, B—, I—Or Fe—) containing compound: $CBr_4$, $CHBr_3$, $CHI_3$, and the like (Aldrich);
 as a co-initiator: EDMABzt; and
 as a liquid crystal compound: E7™, MBBA™ (Merck) and the like.

The formulations are preferably prepared in two stages to ensure proper solubility conditions and prevent undesirable thermal reactions. In a first step, four solutions are prepared separately by magnetic stirring at 30–80 C and complemented with ultrasonic processing:
Solution #1: dye sensitizer with multifunctional monomer/oligomer;
Solution #2: initiator with monomer/oligomer;
Solution #3: co-initiator with monomer/oligomer; and
Solution #4: reversible dye (or liquid crystal) with organic additive.

Mixing is continued until solubilization is complete and the solutions become homogeneous. Procedures of magnetic stirring and ultrasonic processing are following each other and conducted for about 30 minutes each, with the exception of solution #4, which is obtained at room temperature after magnetic stirring for 10 minutes. Prepared solutions are cooled down to and stored at room temperature in the dark for the second stage.

A particular example of step 1 is the preparation by mixing in separate volumes the following solutions:
Solution #1: 0.5 to 7 weight % of IR140™ in DPEPA;
Solution #2: 19 weight % of $CBr_4$ in DPEPA;
Solution #3: 12 weight % of EDMABzt in DPEPA;
Solution #4: 1.5 to 3 weight % of Fulgide™ or Spiropyran™ in 2,5-dibromothiophen or amyl acetate solution
wherein
IR140™ is 5,5'-dichloro-11-diphenylamino-3,3'-diethyl-10,12-ethylenethiatri carbocyanine perchlorate (Aldrich); DPEPA, is di-penta-erithrithol-penta acrylate (Sartomer Company); EDMABzt is ethyl-dimethyl-amino-benzoate (Aldrich); Fulgide™ is 2-(1-(2,5-dimethyl-3-furyl) ethylidene)-3-(2-adamantylidene) succinic anhydride (Aberchrome); and Spiropyran™ is 1',3',3'-trimethylspiro-8-nitro-2H-1-benzopyran-2',2'-indoline (Acros).

In the second step, the solutions are mixed together at desired proportion, at room temperature and in the dark. The solution can be used per se without any filtration.

Sample preparation

The photosensitive solution is injected by capillary effect between two glass slides separated by spacers, for example made of Mylar film, defining the thickness of the cell. A conducting coating such as a transparent indium tin oxide (ITO) coating, can be created on the slides for electric switching operation.

Exposure of the sample

Figure 1A:
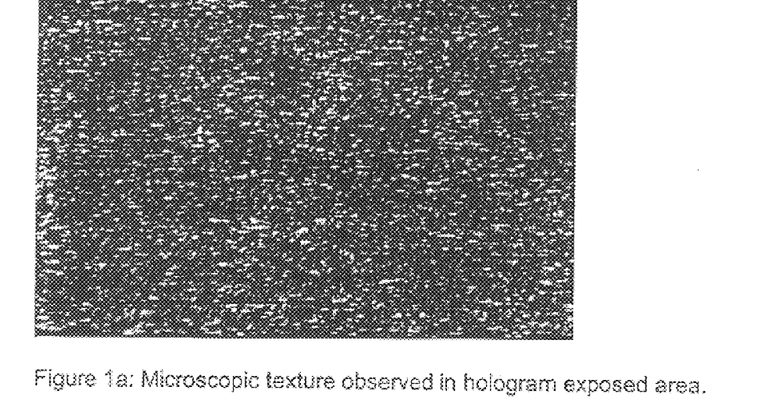
FIG. 1 illustrates the microscopic texture observed in 1a) hologram exposed area, 1b) hologram unexposed area (after uniform exposition) of a hologram recorded by a diode laser at 850 nm. A polarizing optical microscope is used for this observation.
Figure 1B:
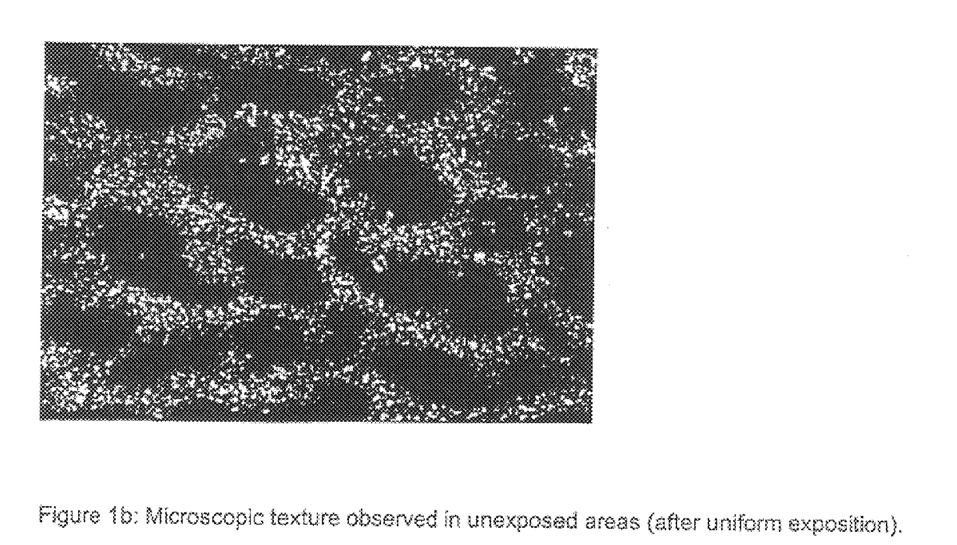
Figure 2:
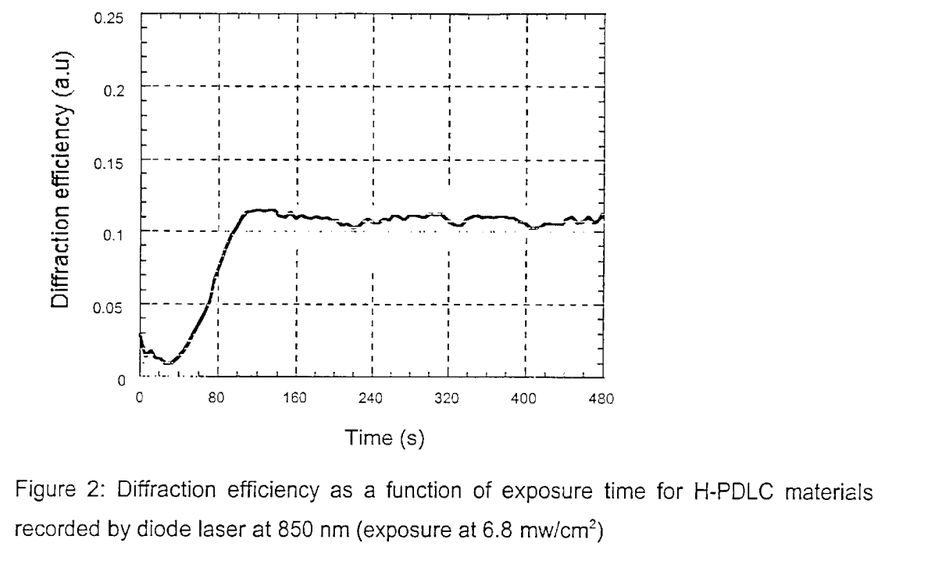
FIG. 2 illustrates the diffracted signal strength as a function of exposure time for the H-PDLC material recorded by diode laser at 850 nm.
Figure 3:
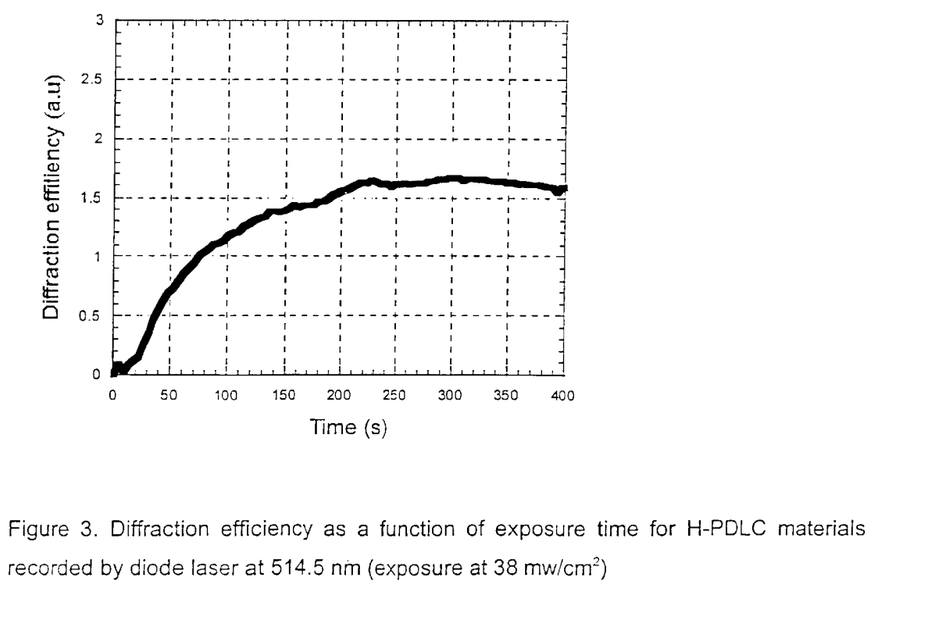
FIG. 3 illustrates a graph of diffracted signal strength as a function of extended readout exposure time for the H-PDLC material according to a preferred embodiment of the invention showing very high temporal and readout stability, recorded by Ar laser at 514 nm illustrates.
Figure 4:
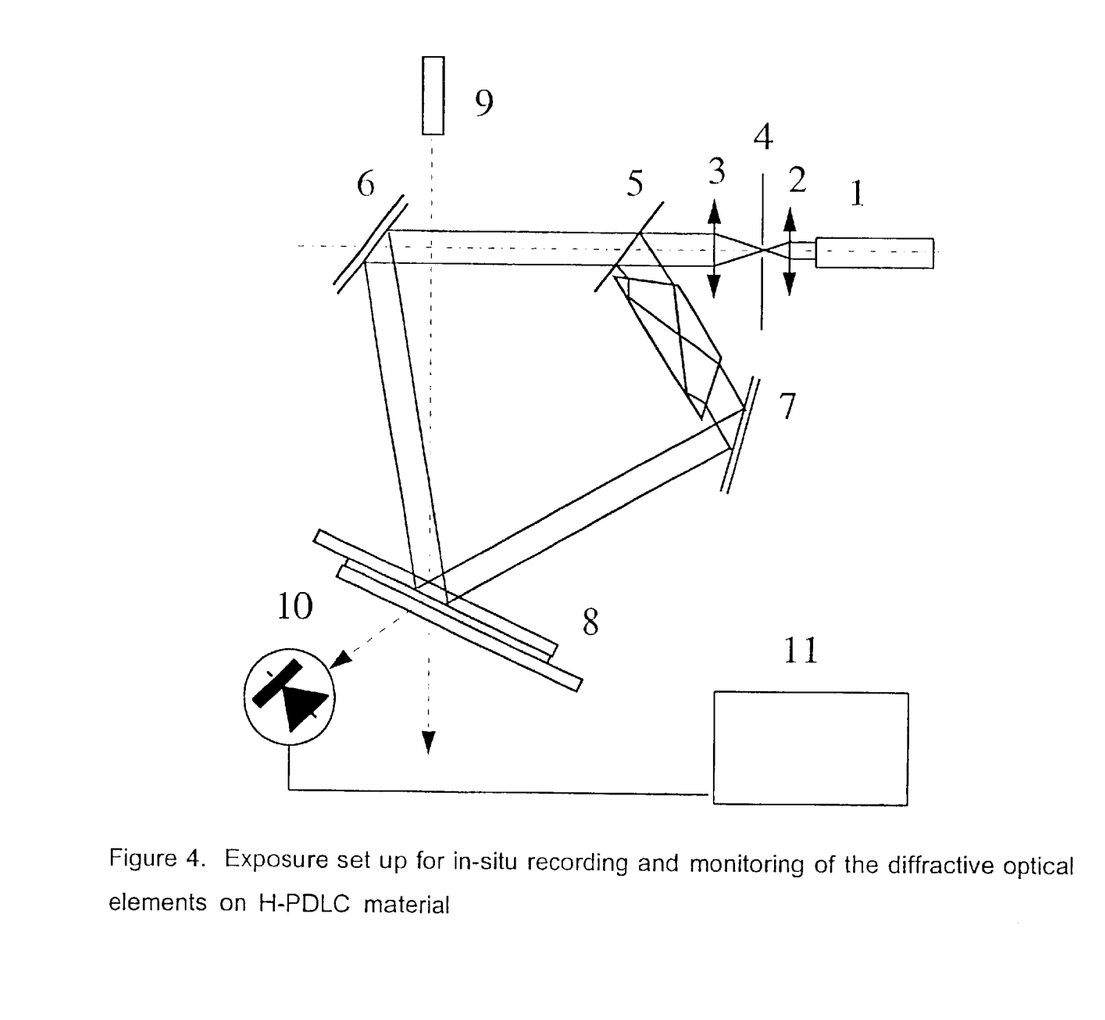
FIG. 4 illustrates an exposure set up for in situ recording and monitoring of diffractive optical elements on H-PDLC material.

Exposure of the sample is carried out in the set up represented in FIG. 4. A laser light 1 is used as an in situ recording source. The laser light should be capable of emitting at various wavelengths in the green to infrared region, i.e., between 500 and 1000 nm. For the purposes of illustrating the present invention, wavelengths of 514, 632.8 and 800–855 nm were used. The laser light is focused into a beam by lenses 2 and 3 and pinhole 4 which is directed to beamsplitter 5. The first split beam is directed to mirror 6 and then onto the cell 8 having the H-PDLC layer, while the second split beam is directed to mirror 7 and then onto cell 8. The weak readout beam's wavelength from laser 9 is chosen to be 514 nm to ensure nondestructive monitoring of the recording process. Monitoring is carried out using photodetector 10 and computer 11. After recording, the sample is subjected to a stability test, which consists of a uniform exposure to one of the recording beams. This uniform exposure to the recording beam leads to full polymerization in all areas, exposed and non-exposed during the first exposition. If the hologram is stable, such an exposure would fix the created modulation of the refractive index. Alternatively, i.e. if the hologram is unstable, such an exposure would lead to partial or complete erasure of the hologram.

In the following examples of formulations, the filler employed is the compound of formula I unless stated otherwise.

EXAMPLE 1

Sample Preparation for Photopolymer Reaction
(Holographic Recording by Diode Laser 850 nm

| | | |
|---|---:|---|
| filler | 15.00 | weight % |
| IR-140 (dye sensitizer) | 0.16 | weight % |
| $CBr_4$ (initiator) | 4.58 | weight % |
| EDMABZ (co-initiator) | 3.04 | weight % |
| DPEPA (monomer) | 47.22 | weight % |
| 2,5-dibromothiophen (organic additive) | 30.00 | weight % |

For a thickness of 30 micrometers and spatial frequency of about 1200 lines/mm, the obtained samples exhibit the following recording parameters: Diffraction efficiency for p-polarization at $\lambda$=633–850 nm: $\eta$=98% (exposition: E=6.9 mW/cm$^2$)

EXAMPLE 2

Sample Preparation for Photopolymer Reaction
(Recording by He-Ne at 632.8 nm)

| | | |
|---|---:|---|
| filler | 2.95 | weight % |
| IR-140 (dye sensitizer) | 0.57 | weight % |
| $CBr_4$ (initiator) | 2.74 | weight % |
| EDMABZ (co-initiator) | 2.03 | weight % |
| DPEPA (monomer) | 63.84 | weight % |
| 2,5-dibromothiophen (organic additive) | 27.87 | weight % |

For a thickness of 30 micrometers and spatial frequency of about 1200 lines/mm the obtained samples exhibit the following recording parameters: Diffraction efficiency for p-polarization at $\lambda$=633–850 nm: $\eta$=70% (E=2 mW/cm$^2$)

EXAMPLE 3

Sample Preparation for Photopolymer Reaction
(Holographic Recording Ar Laser at 514 nm)

| | | |
|---|---:|---|
| filler | 15.00 | weight % |
| IR-140 (dye sensitizer) | 0.32 | weight % |
| $CBr_4$ (initiator) | 4.58 | weight % |
| EDMABZ (co-initiator) | 3.04 | weight % |
| DPEPA (monomer) | 47.06 | weight % |
| 2,5-dibromothiophen (organic additive) | 30.00 | weight % |

For a thickness of 30 micrometers and spatial frequency of about 1200 lines/mm the obtained samples exhibit the following recording parameters:

diffraction efficiency for p-polarization at $\lambda$=514–660 nm: $\eta$=95–98% (E=38 mW/cm$^2$);

diffraction efficiency for p-polarization at $\lambda$=514–660 nm: $\eta$=90% (E=6 mW/cm$^2$)

EXAMPLE 4

Sample preparation for Photopolymer Reaction
(Holographic Recording Ar Laser at 514 nm)
Without $CBr_4$

| | | |
|---|---:|---|
| filler | 6.02 | weight % |
| IR-140 (dye sensitizer) | 0.33 | weight % |
| EDMABZ (initiator) | 2.93 | weight % |
| DPEPA (monomer) | 42.53 | weight % |
| 2,5-dibromothiophen (organic additive) | 48.19 | weight % |

For a thickness of 30 micrometers and spatial frequency of about 1200 lines/mm the obtained samples exhibit the following recording parameters: Diffraction efficiency for p-polarization at $\lambda$=514–660 nm: $\eta$=60% (E=7.5 mW/cm$^2$)

EXAMPLE 5

Sample Preparation for Photopolymer Reaction
(Holographic Recording by Diode Laser at 850 nm)
Wherein the Filler is a Reversible Dye (Fulgide)

| | | |
|---|---:|---|
| Fulgide (reversible dye) | 1.57 | weight % |
| IR-140 (dye sensitizer) | 0.28 | weight % |
| $CBr_4$ (initiator) | 7.15 | weight % |
| EDMABZ (co-initiator) | 3.94 | weight % |
| DPEPA (monomer) | 78.37 | weight % |
| amyl acetate (organic additive) | 8.68 | weight % |

For a thickness of 30 microns and spatial frequency of about 1200 lines/mm the obtained samples exhibit the following recording parameters: Diffraction efficiency for p-polarization at $\lambda$=633–850 nm: $\eta$=70% (E=6.9 mW/cm$^2$)

EXAMPLE 6

Sample Preparation for Photopolymer Reaction
(Holographic Recording by He-Ne Laser at 633 nm) Wherein the Filler is a Reversible Dye (Spiropyran)

| | | |
|---|---:|---|
| Spiropyran (reversible dye) | 2.95 | weight % |
| IR-140 (dye sensitizer) | 0.58 | weight % |
| $CBr_4$ (initiator) | 2.75 | weight % |
| EDMABZ (co-initiator) | 2.02 | weight % |
| DPEPA (monomer) | 63.84 | weight % |
| 2,5-dibromothiophen (organic additive) | 27.86 | weight % |

For a thickness of 30 micrometers and spatial frequency of about 1200 lines/mm the obtained samples exhibit the following recording parameters: Diffraction efficiency for p-polarization at $\lambda$=514–850 nm: $\eta$=70% (E=38 mW/cm$^2$).

Monomer modification is also contemplated, as for example 2EEEA, which gives "zero dispersion of diffraction efficiency" of the recording. Another monomer (urethaneacrylate CN975) gives positive dispersion of diffraction efficiency. Negative dispersion was observed with DPEPA only.

The present invention provides for high efficiency of holographic in situ recording with lasers emitting at 500–1000 nm. The recorded holograms exhibit extremely high photochemical stability. Readout of the hologram did not show signs of any degradation, and the recorded holographic optical elements are switchable with optical excitation and DC voltage methods.

The photopolymer formulation according to the invention can be utilized, with or without a filler such as a liquid crystal, as an optical coupling binder which is photoreacted-using light from conventional diodes operating in the green to infrared spectral band. The light for photoreacting can be provided by an external light source or in some cases from coupled light guides.

The photopolymer formulation can also be applied to non-optical and non-holographic device applications, such as laser controlled prototyping, in which green, red, near infrared or infrared laser light could be used to control photopolymerization in a computer controlled plastic prototype manufacturing device.

While the invention has been described in connection with specific embodiments thereof, it will be understood that it is capable of further modifications, and this application is intended to cover any variations, uses or adaptations of the invention following, in general, the principles of the invention, and including such departures from the present description as come within known or customary practice within the art to which the invention pertains, and as may be applied to the essential features hereinbefore set forth, and as follows in the scope of the appended claims.

What is claimed is:

1. A photopolymerizable composition sensitive to light in a green to infrared region of the optical spectrum, comprising:
    a photopolymerizable monomer or oligomer, or a mixture thereof, capable of forming a polymer having predetermined optical properties;
    a photoinitiator sensitive to light in said region, said photoinitiator comprising a dye sensitizer and an initiator, wherein said dye sensitizer is a cyanine dye having a perchlorate anion and said initiator is an electron donor;
    an additive for increasing refractive index and decreasing viscosity of the composition; and
    a filler having optical properties selected to contrast with the optical properties of the polymer, said filler being selected from the group consisting of liquid crystals, photochromic reversible dyes and mixtures thereof.

2. A composition according to claim 1, wherein said cyanine dye is 5,5'-dichloro-11-diphenylamino-3,3'-diethyl-10,12-ethylenethiatricarbocyanine perchlorate.

3. A composition according to claim 2, wherein said electron donor is carbon tetrabromide.

4. A composition according to claim 3, wherein said photoinitiator further includes a co-initiator.

5. A composition according to claim 4, wherein said co-initiator is ethyl-dimethyl-amino-benzoate.

6. A composition according to claim 1, wherein said additive is 2,5-dibromothiophen or amyl acetate.

7. A composition according to claim 1, wherein the filler is a liquid crystal of general formula $XC_nO_mNR_1R_2$ wherein
    $R_1$ and $R_2$ are the same or different and each represent a straight or branched $C_{1-10}$ alkyl, a straight or branched $C_{1-10}$ alkene or a straight or branched $C_{1-10}$ alkyne;
    X is a linking group substituted by at least one polar group;
    $C_n$ is a straight or branched alkyl chain having 5 to 14 carbon atoms, optionally containing at least one unsaturation; and
    m is 0 or 1.

8. A composition according to claim 7, wherein X is a biphenyl group mono-substituted by a cyano group.

9. A composition according to claim 7, wherein $C_n$ is a straight alkyl chain having 7 or 9 carbon atoms, and m is 1.

10. A process for producing an optical device, comprising the steps of:
    a) providing an optical element;
    b) providing a photopolymerizable composition sensitive to light in a green to infrared region of the optical spectrum, said composition comprising:
        a photopolymerizable monomer or oligomer, or a mixture thereof, capable of forming a polymer having predetermined optical properties;
        a photoinitiator sensitive to light in said region, said photoinitiator comprising a dye sensitizer and an initiator, wherein said dye sensitizer is a cyanine dye having a perchlorate anion and said initiator is an electron donor;
        an additive for increasing refractive index and decreasing viscosity of the composition; and
        a filler having optical properties selected to contrast with the optical properties of the polymer, said filler being selected from the group consisting of liquid crystals, photochromic reversible dyes and mixtures thereof;
    c) applying a layer of the photopolymerizable composition onto the optical element; and
    d) exposing the optical element with the layer of photopolymerizable composition thereon to light in said region to cause polymerization of the monomer or oligomer, or mixture thereof, and formation of a recording pattern on the optical element, the recording pattern comprising areas having different densities of filler in exposed and unexposed areas of the layer, thereby obtaining an optical device having thereon areas with different optical properties.

11. A process according to claim 10, wherein the optical element is a diffractive element switchable between a diffractive state and a non-diffractive state.

12. A process according to claim 10, wherein said cyanine dye is 5,5'-dicloro-11-diphenylamino-3,3'-diethyl-10,12-ethylenetbiatricarbocyanine perchlorate.

13. A process according to claim 12, wherein said electron donor is carbon tetrabromide.

14. A process according to claim 13, wherein said photoinitiator further includes a co-initiator.

15. A process according to claim 14, wherein said co-initiator is ethyl-dimethyl-amino-benzoate.

16. A process according to claim 10, wherein said additive is 2,5-dibromothiophen or amyl acetate.

17. A process according to claim 10, wherein the filler is a liquid crystal of general formula $XC_nO_mNR_1R_2$ wherein
    $R_1$ and $R_2$ are the same or different and each represent a straight or branched $C_{1-10}$ alkyl, a straight or branched $C_{1-10}$ alkene or a straight or branched $C_{1-10}$ alkyne;
    X is a linking group substituted by at least one polar group;
    $C_n$ is a straight or branched alkyl chain having 5 to 14 carbon atoms, optionally containing at least one unsaturation; and
    m is 0 or 1.

18. A process according to claim 17, wherein X is a biphenyl group mono-substituted by a cyano group.

19. A process according to claim 17, wherein $C_n$ is a straight alkyl chain having 7 or 9 carbon atoms, and m is 1.

20. A method of optically connecting at least two waveguides of an optical element, comprising the steps of:
- a) providing an optical element having at least two waveguides to be optically connected
- b) providing a photopolymerizable composition sensitive to light in a green to infrared region of the optical spectrum, said composition comprising:
    a photopolymerizable monomer or oligomer, or a mixture thereof, capable of forming a polymer having predetermined optical properties;
    a photoinitiator sensitive to light in said region, said photoinitiator comprising a dye sensitizer and an initiator, wherein said dye sensitizer is a cyanine dye having a perchlorate anion and said initiator is an electron donor; and
    an additive for increasing refractive index and decreasing viscosity of the composition; and
- c) applying the photopolymerizable composition between the waveguides to be connected; and
- d) exposing said photopolymerizable composition between said waveguides to light in said region to cause polymerization of the monomer or oligomer, or mixture thereof, thereby forming an optical connection between said waveguides.

21. A method according to claim 20, wherein said cyanine dye is 5,5'-dicloro-11-diphenylamino-3,3'-diethyl-10,12-ethylenethiatricarbocyanine perchlorate.

22. A method according to claim 21, wherein said electron donor is carbon tetrabromide.

23. A method according to claim 22, wherein said photoinitiator further includes a co-initiator.

24. A method according to claim 23, wherein said co-initiator is ethyl-dimethyl-amino-benzoate.

25. A method according to claim 20, wherein said additive is 2,5-dibromothiophen or amyl acetate.

26. A method according to claim 20, wherein in step (d) said light is transmitted through at least one of said waveguides.

* * * * *